(12) United States Patent　　(10) Patent No.:　　US 10,795,409 B2
Patterson et al.　　(45) Date of Patent:　　Oct. 6, 2020

(54) DIGITAL ASSISTANT DEVICE

(71) Applicant: Lenovo (Singapore) Pte. Ltd., Singapore (SG)

(72) Inventors: Samuel Jackson Patterson, Raleigh, NC (US); Thomas Perelli, Raleigh, NC (US); Cuong Huy Truong, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/716,450

(22) Filed: Dec. 16, 2019

(65) Prior Publication Data

US 2020/0117234 A1　　Apr. 16, 2020

Related U.S. Application Data

(63) Continuation of application No. 15/864,358, filed on Jan. 8, 2018, now Pat. No. 10,509,437.

(51) Int. Cl.
　　*G06F 1/16*　　(2006.01)
　　*F16M 13/02*　　(2006.01)
　　*F16M 13/00*　　(2006.01)
　　*F16M 11/10*　　(2006.01)
　　*H04N 7/14*　　(2006.01)
　　*H04N 5/225*　　(2006.01)
　　*H04N 5/235*　　(2006.01)

(52) U.S. Cl.
　　CPC .......... *G06F 1/1626* (2013.01); *G06F 1/1656* (2013.01); *G06F 1/1686* (2013.01); *G06F 1/1688* (2013.01); *G06F 1/1637* (2013.01); *H04N 5/2252* (2013.01); *H04N 5/2353* (2013.01); *H04N 7/141* (2013.01); *H04N 7/142* (2013.01)

(58) Field of Classification Search
CPC .... G06F 1/1626; G06F 1/1656; G06F 1/1686; G06F 1/1688; G06F 1/1637; H04N 5/2252; H04N 5/2353; H04N 7/141; F16M 11/105; F16M 13/00; F16M 13/022; F16M 2200/04; F16M 2200/08; F16M 13/02; F16M 11/10; Y10S 248/919; A47B 91/00
See application file for complete search history.

(56) References Cited

U.S. PATENT DOCUMENTS 8,876,076 B2 * 11/2014 Lee ....................... F16M 11/105
　　　　　　　　　　　　　　　　　　　　248/346.2
D741,846 S * 10/2015 Jeon ............................ D14/253
(Continued)

*Primary Examiner* — Pablo N Tran
(74) *Attorney, Agent, or Firm* — Ference & Associates LLC

(57) ABSTRACT

One embodiment provides an electronic device, including: a housing comprising: a fixed pyramidal-shaped base having a first triangular stand surface and a second triangular stand surface, wherein the first triangular stand surface comprises different dimensions than the second triangular stand surface; a display positioned on a front surface of the housing; an integrated speaker positioned on the front surface; at least one sensor; a connection port positioned on a back surface of the housing, opposite from the front surface, and at a distal corner along a longer edge of the fixed pyramidal-shaped base; and at least one processor operatively coupled to the display, integrated speaker, and at least one sensor. Other aspects are described and claimed.

14 Claims, 5 Drawing Sheets

(56) References Cited

U.S. PATENT DOCUMENTS

| | | | | |
|---|---|---|---|---|
| 9,413,862 | B2* | 8/2016 | Tang | ............... H04M 1/03 |
| 9,915,393 | B2* | 3/2018 | Grove | ............. F16M 11/2021 |
| 10,487,528 | B2* | 11/2019 | Pozybill | ............. A47G 33/12 |
| 2001/0011993 | A1* | 8/2001 | Saarinen | ............. H04R 5/04 |
| | | | | 345/156 |
| 2012/0282868 | A1* | 11/2012 | Hahn | ............. H01Q 9/0407 |
| | | | | 455/90.3 |
| 2020/0089702 | A1* | 3/2020 | Chapps | ............ H04N 21/4223 |

* cited by examiner

DIGITAL ASSISTANT DEVICE

CROSS REFERENCE TO RELATED APPLICATIONS

This application is a continuation application of U.S. patent application Ser. No. 15/864,358, filed on Jan. 8, 2018 and entitled "Digital Assistant Device," the contents of which are incorporated by reference herein.

BACKGROUND

Advances in technology have led to the development of the home automation network, or "Smart Home", which is a residence having one or more smart home devices ("devices"), for example appliances, lighting, heating, air conditioning, TVs, computers, entertainment audio and video systems, security, and camera systems that are capable of communicating with one another and can be controlled remotely by a user. The presence of these devices provides the home and its occupants various benefits such as convenience and savings of time, money, and energy. Many of the current devices currently available require a unifying device to control their function and integrate separate components into a larger eco-system that meets the needs of the end-user.

BRIEF SUMMARY

In summary, one aspect provides an electronic device, comprising: a housing comprising: a fixed pyramidal-shaped base having a first triangular stand surface and a second triangular stand surface, wherein the first triangular stand surface comprises different dimensions than the second triangular stand surface; a display positioned on a front surface of the housing; an integrated speaker positioned on the front surface; at least one sensor; a connection port positioned on a back surface of the housing, opposite from the front surface, and at a distal corner along a longer edge of the fixed pyramidal-shaped base; and at least one processor operatively coupled to the display, integrated speaker, and at least one sensor.

Another aspect provides an electronic device, comprising: a housing comprising: a fixed pyramidal-shaped base having a first triangular stand surface and a second triangular stand surface, wherein the first triangular stand surface comprises different dimensions than the second triangular stand surface; a display positioned on a front surface of the housing; an integrated speaker positioned on the front surface; at least one sensor; a connection port positioned on a back surface of the housing, opposite from the front surface, and at a distal corner along a longer edge of the fixed pyramidal-shaped base; and at least one processor operatively coupled to the display, integrated speaker, and the at least one sensor; a memory device operatively coupled to the at least one processor, the memory device storing digital assistant instructions for execution by the at least one processor to: receive, via the at least one sensor, user input and thereafter provide responsive output.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
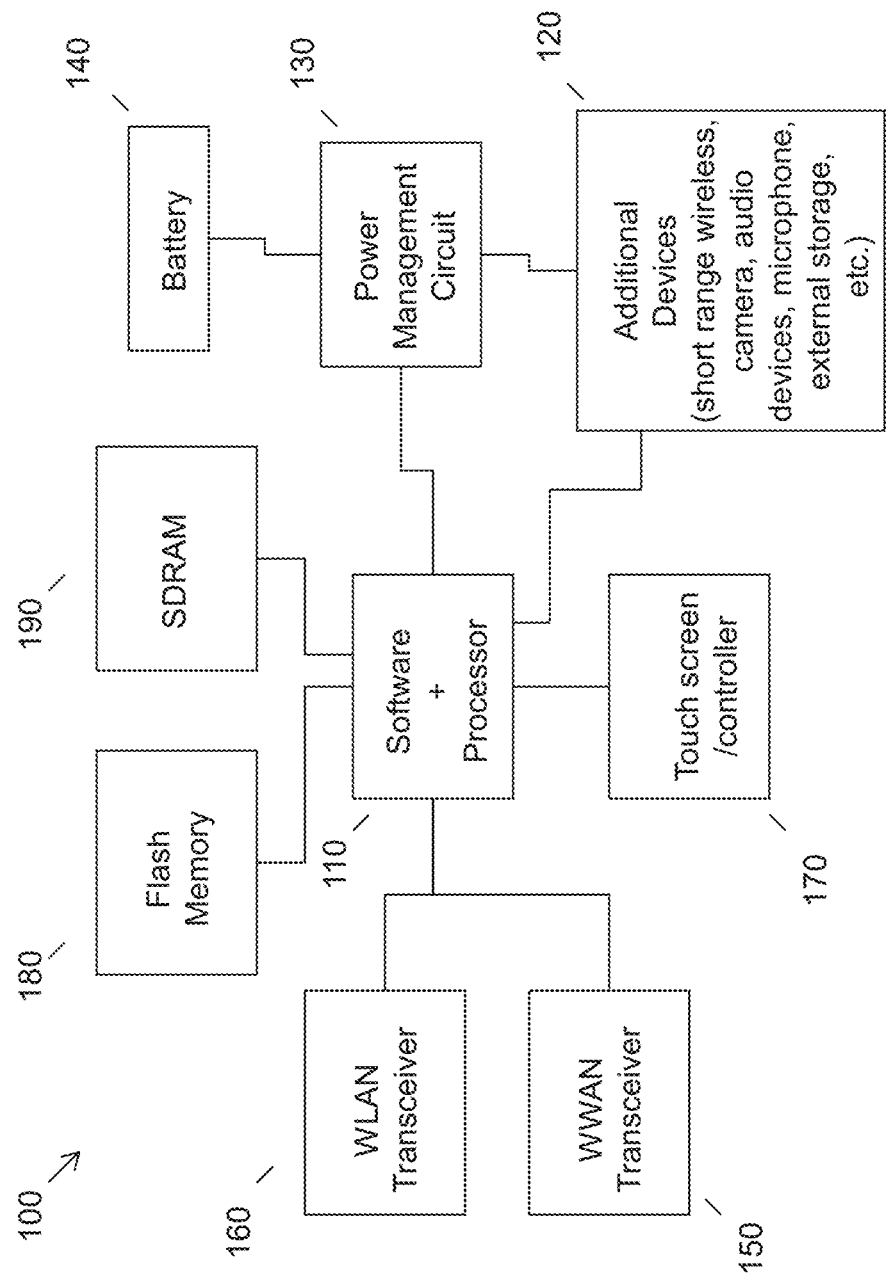
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit, the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

A need exists to integrate many features and functions into a single device (e.g., a hub device, etc.) traditionally served by multiple, standalone devices throughout the home. Such a device may act as the central control point for a series of peripheral devices capable of performing various functions while simultaneously allowing the user to access software applications and features through an onboard user interface. A problem exists, however, in that many of the features and functions served by such a device are limited in performance by an all-in-one ("AIO") form factor. Stated differently, standalone devices excel in performance for each of their intended functionalities because they do not accommodate for integration of other devices. When combined into a single form-factor, the hub-device allows for significant improvement in convenience and control but is limited in performance due to the physical constraints of each device.

Primarily, a conflict exists between the display orientation of video watching and user-to-user video calling. For optimization of both of these functions, an AIO device should accommodate for landscape and portrait display orientations without sacrificing performance. Additionally, there are greater physical constraints imposed on different features as they relate to anthropometry and device interaction. For example, the viewing angle of a device with digital display is significantly impaired by the relative distance the device is placed from the user and the height of the surface on which the device is placed. Additionally, corded devices (i.e., devices having a power cord, USB cord, etc., attached to an electric port, etc.) often suffer from cord length issues when the corded device is manipulated between landscape and portrait mode. It is therefore necessary to enable a device for use on various surface heights found in the home while also accommodating the need for the device to be viewed from both a distance and up-close during direct interaction and manipulation.

Existing devices intended to serve as an AIO smart home automation system often sacrifice ease of use and functionality (e.g., they cannot support landscape and portrait display mode, etc.) or are limited to a single function (e.g., audio only, video only, etc.). For example, a smart speaker may be used to perform different functions related to other devices within the home, but these devices do not provide a display. No current solutions exist that offer multi-mode display orientation functionality in either the inherent hardware or software configuration while providing the integration of audio, video, touch interaction, smart, home device control, and video conferencing within a single form factor. Furthermore, tangentially related devices not intended for strict utilization within the smart home tablets, notebooks, smartphones, etc.) are also limited in their functionality as they require external or accessory devices to enable the full range of features and functionality that are found in AIO smart home devices.

Accordingly, an embodiment provides an integrated hub-device with touch display for the home that allows for optimization in various modes of use within a single form factor without the use of external armatures, moving mechanical parts (e.g., hinges, etc.), kick-stand, or accessory devices. An embodiment may comprise an electronic device having a housing that may comprise a fixed pyramidal-shaped base, a display, and an integrated mechanical speaker. In an embodiment, the electronic device may further comprise at least one sensor (e.g., at least one microphone, at least one camera, etc.) and/or a mechanical integrated camera shutter. The electronic device may provide a means that allows the device to be positioned in a variety of different orientation modes (e.g., portrait mode, landscape mode, etc.) while optimizing the features of the electronic device for the positioned or desired mode. Additionally, in an embodiment, the electronic device may connect and communicate with a plurality of other smart devices (e.g., smart appliances, smart TVs, etc.).

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system n a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera. System 100 often includes a touch screen 170 for data input and display/rendering. System 100 also typically includes various memory devices, for example flash memory 180 and SDRAM 190.

Figure 2:
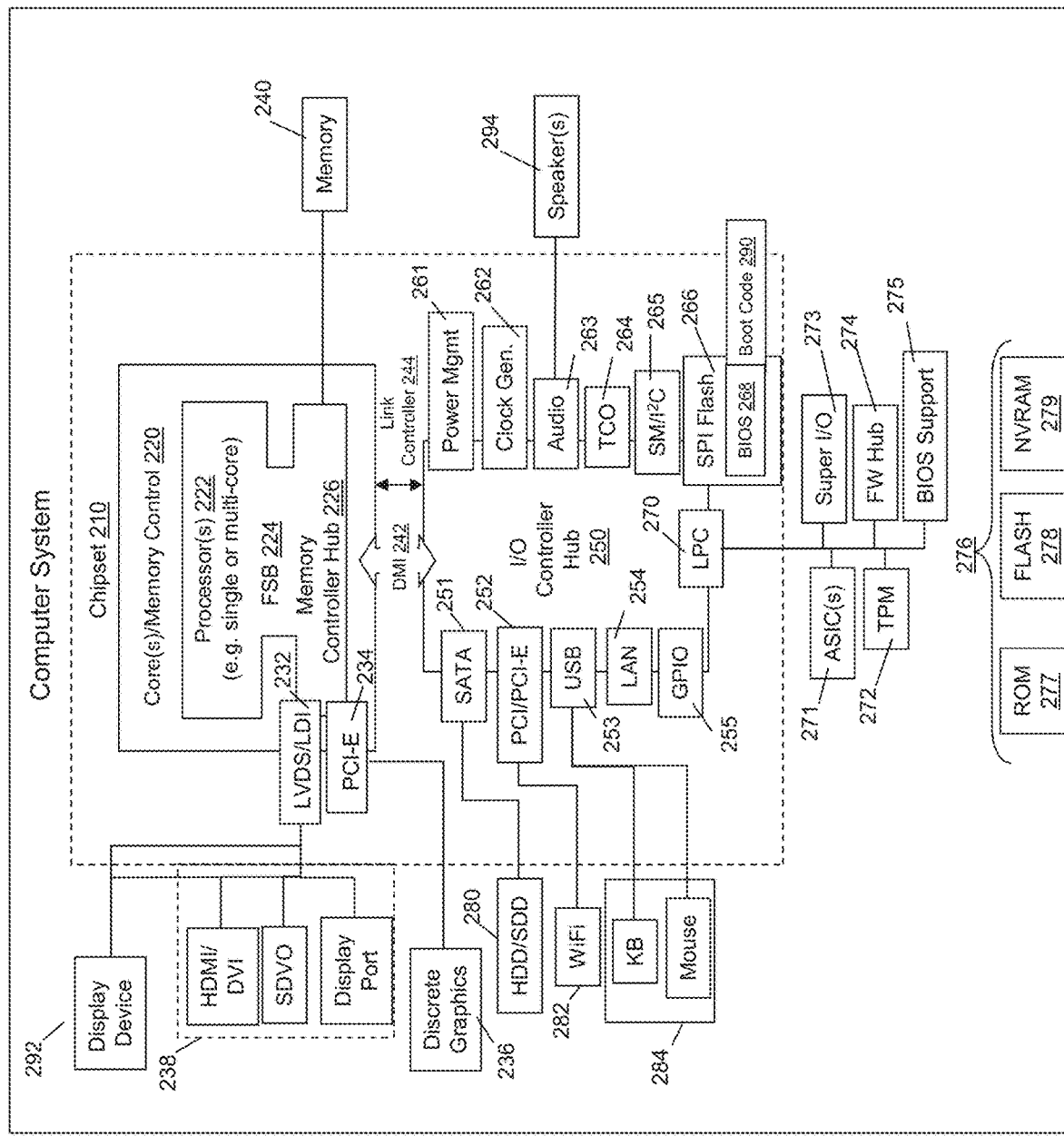
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices which users may use to receive user input or perform functions associated with user input. For example, the circuitry outlined in FIG. 1 may be implemented in a tablet or smart phone embodiment, whereas the circuitry outlined in FIG. 2 may be implemented in a personal computer embodiment. The information handling device circuitry shown in FIG. 1 and/or FIG. 2 may be implemented in the system as described herein.

Figure 3:
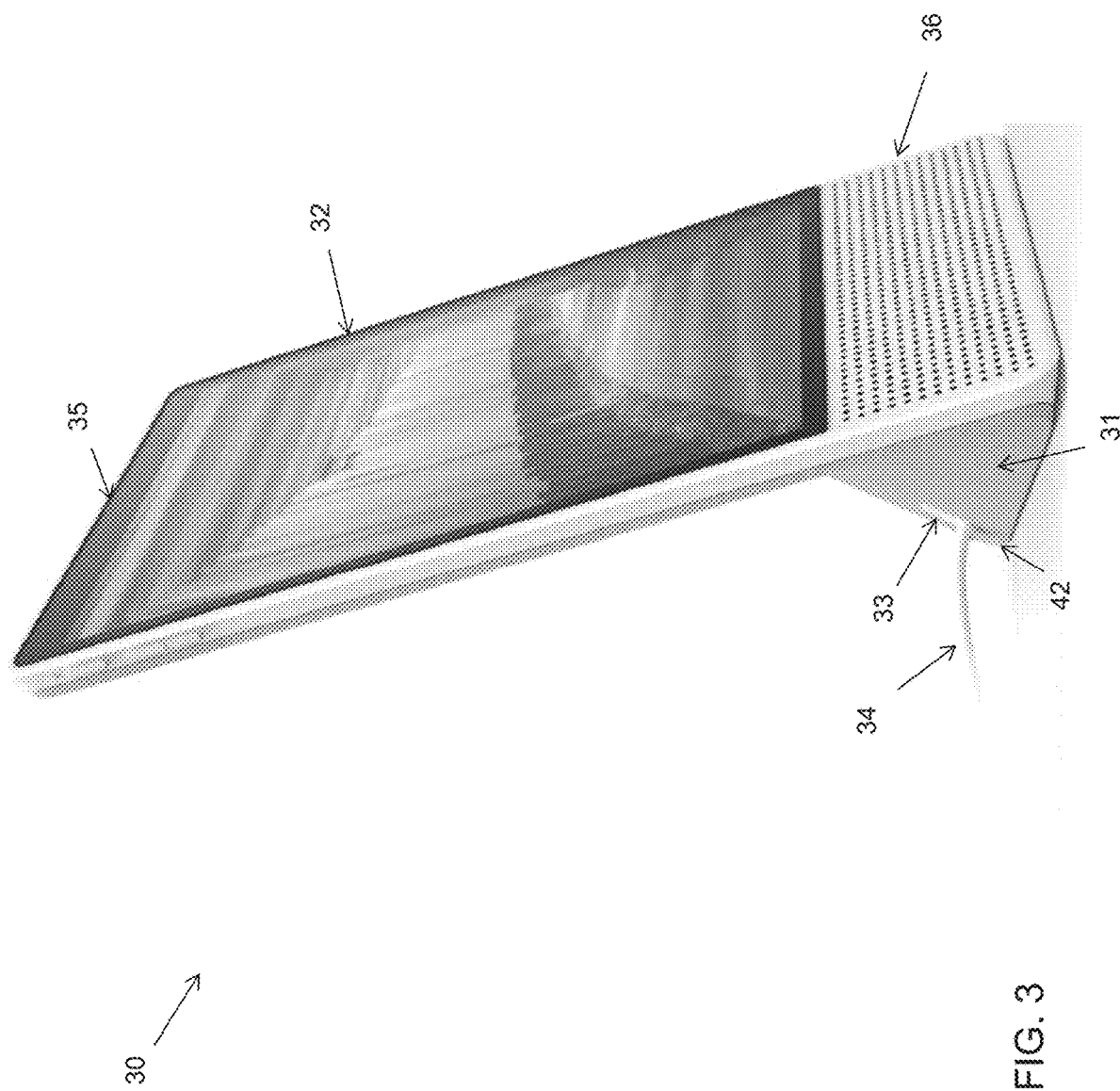
FIG. 3 illustrates an example illustration of an information handling device according to an embodiment.
Figure 4B:
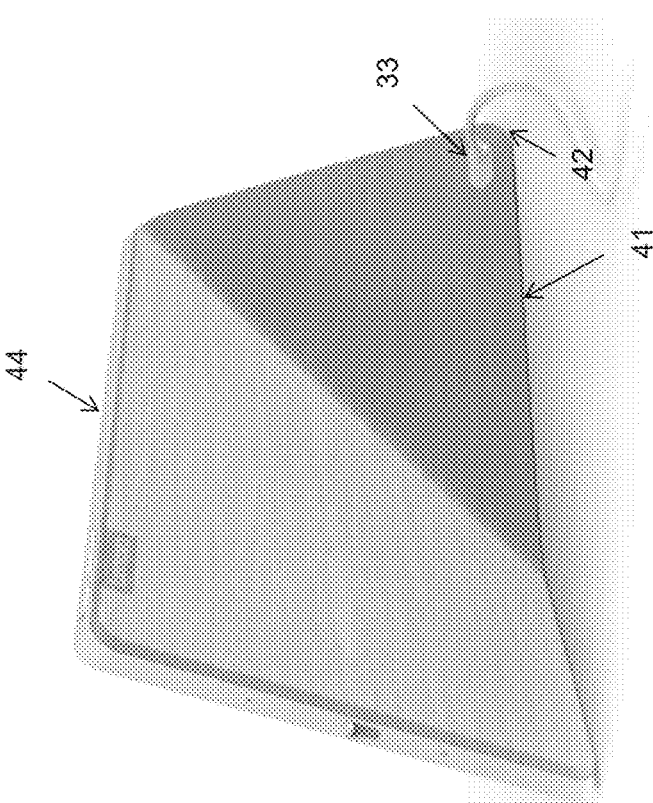
FIG. 4B illustrates an example illustration of an information handling device according to an embodiment positioned in a landscape orientation.
Figure 4A:
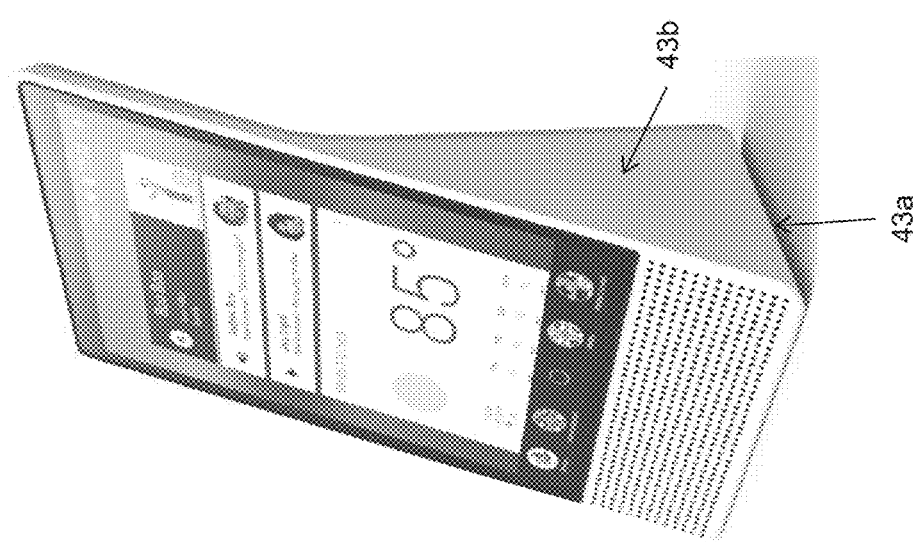
FIG. 4A illustrates an example illustration of an information handling device according to an embodiment positioned in a portrait orientation.
Figure 5:
FIG. 5 illustrates an integrated mechanical camera shutter of the information handling device according to an embodiment.

FIGS. 3-5 illustrate an electronic device according to an embodiment. The electronic device may be a smart display having a housing comprising a fixed pyramidal-shaped base, a display screen, and an integrated speaker. The smart display may further comprise one or more sensors (e.g., microphones, cameras, etc.) located at various positions around the smart display and/or smart display housing as well as an integrated mechanical camera shutter that is adjustable by a user. The aforementioned features of the smart display are further elaborated upon below.

Referring now to FIG. 3, in an embodiment, the smart display 30 may include an integrated housing that comprises a fixed pyramidal-shaped base 31. The fixed pyramidal-shaped base 31 may act as a sturdy stand to support the smart display 30 throughout the various orientations of use (e.g., portrait mode, landscape mode, etc.). In an embodiment, each side of the fixed pyramidal-shaped base 31 may have different dimensions than other sides of the fixed pyramidal-shaped base 31. The geometry of the sides of the fixed pyramidal-shaped base 31 may be further visualized by reference to FIGS. 4A and 4B. As can be seen from the example embodiments illustrated in the figures, the fixed pyramidal-shaped base 31 may comprise a longer edge 41 that protrudes from a back portion of the smart display 30, opposite the side of the display screen 32, and terminates at a corner 42 that is distal from the display screen 32. As a result of this distal corner 42, two, triangular stand surfaces 43*a* and 43*b* are created. The dimensions of each of the triangular stand surfaces 43*a* and 43*b* may be different from one another but both may still be capable of providing appropriate support for the smart display 30 regardless of the orientation of use.

The independent geometry of each of the sides allows for manipulation of the smart display 30 into various modes of use as needed for each function or to improve the viewing angle from a desired distance or surface height. For example, in an embodiment, the portrait orientation may have a 70-degree viewing angle relative to the horizontal plane, the landscape orientation may accommodate a shallower, 50-degree viewing angle, while a third viewing position may allow for a 40-degree viewing angle. As such, the geometry of the fixed pyramidal-shaped base 31 allows the smart display 30 to be physically manipulated into the most optimal position for the intended feature. Additionally, due to the fixed nature of the fixed pyramidal shaped base 31, the smart display 30 may be quickly moved into a new mode for a separate feature without adjusting any armature, mechanism, or kick-stand.

In an embodiment, the smart display 30 may comprise an electronic connection 33 capable of connecting a wired cord 34 (e.g., a power cord, a charging cord, USB cord, etc.). The wired cord may include a power cord, data cord, or a combination cord that provides transference of both power and data. Additionally, the wired cord may be removable. For example, the electronic connection may include a plug into which a cord can be plugged. Alternatively, the electronic connection 33 may be fixed with a cord that is not removable from the smart display 30. In an embodiment, the electronic connection 33 may be located proximate to the distal corner 42 of the fixed pyramidal shaped base 31. For example, referring to FIGS. 3 and 4B, the electronic connection 33 may be placed at an edge of the distal corner 42. Such a placement for the electronic connection 33 may allow the smart display 30 to be manipulated between orientation modes without affecting a length factor of the wired cord 34. Stated differently and with reference to FIG. 4B, if the smart display 30 is reoriented from landscape mode to portrait mode, the position of the electronic connection 33 may remain in substantially the same spot, thereby eliminating the need for a user to further adjust the position of the smart display 30 in order to accommodate the length of the wired cord 34.

In an embodiment, the display screen 32 may be capable of displaying contents (e.g., images, videos, phone and/or video calls, messages, various applications, etc.) on the smart display 30. In an embodiment, the contents on the display screen 32 may be automatically rearranged, scaled, and/or optimized based upon a detected orientation of the smart display 30. For example, the contents on the display screen 32 may be arranged a particular way (e.g., according to a predetermined ruleset, etc.) when the smart display 30 is positioned in portrait mode and a different way when the smart display 30 is positioned in landscape mode (e.g., the user interface may be automatically scaled and optimized to run in wide-screen mode, etc.). Similarly, in an embodiment, rotating the device into one of the orientation modes may automatically trigger a predetermined action by either the developer or user launching a specific device application or service, etc.).

An embodiment may be able to detect an orientation of the smart display 30 using conventional sensors (e.g., gyroscopes, accelerometers, etc.). Additionally or alternatively, an embodiment may be able to further detect an orientation of the smart display 30, or receive further confidence data of an assumed orientation, based upon at least one captured image. For example, the smart display 30 may comprise a front-facing camera 35 capable of capturing images, videos, etc. An embodiment may utilize the front-facing camera 35 to capture one or more images and thereafter analyze e.g., using one or more conventional image analysis techniques, etc.) the one or more images to determine if the one or more images contain known properties associated with portrait or landscape images (e.g., length to width ratios of the image (s), other dimensional image properties, etc.).

In an embodiment, the smart display 30 may further comprise an integrated speaker 36 capable of providing high quality stereo audible output. Additionally or alternatively, the smart display 30 may comprise a plurality of microphones illustrated) positioned on different sides of the housing. The plurality of microphones may serve to optimize the audio capturing of the smart display 30 for 360 degree sound capture. For example, in an embodiment, the smart display 30 may comprise at least two sets of microphones where each of the microphone sets are positioned on a different side, or edge, of the housing. Therefore, regardless of the orientation mode of the device, at least one set of microphones will always be oriented toward the ceiling allowing for unobstructed (e.g., by a surface, etc.) audio to be received. In an embodiment, the unobstructed microphone set may be identified based upon a detected orientation of the device. For example, an embodiment may detect that the smart display has been positioned in landscape mode, as illustrated in FIG. 4B. An embodiment may thereafter identify that in that positional orientation, the set of microphones located on side 44 may be unobstructed and thereby capture audio through those microphones instead of the microphone set on a different side of the device. The device may also include noise cancellation hardware or software that may be used by the device to filter the sound captured by the microphone to only the voice input provided by a user, thereby creating a more efficient and effective audio capture experience.

Referring now to FIG. 5, in an embodiment, another of the plurality of sensors of the smart display 30 may be a front-facing camera 35. The front-facing camera 35 may be capable of capturing images and videos which may be used to identify gesture inputs from a user, identify user and/or object identities, used in video calling applications, and the like. In an embodiment, the front-facing camera 35 may be able to capture an image of one or more objects positioned in a field of view of the camera 35. Responsive to receiving user command input, an embodiment may be able to perform a corresponding function associated with the one or more objects. For example, a user holding a cucumber may stand in front of the smart display 30 and provide the voice input "what can I make with this?" An embodiment may be able to capture an image of the user and disambiguate (e.g., using context cues, etc.) the deistic term, "this", as meaning the object the user is holding. An embodiment may identify (e.g., by comparing the image of the captured object to an accessible list of object images, utilizing other object identification techniques, etc.) the object as a cucumber and thereafter provide a list of recipes involving a cucumber. In another embodiment, a user may position a plurality of food objects in the field of view of the front-facing camera 35 and thereafter provide the query input "what can I make with these?" An embodiment may be able to capture an image of the food objects, identify what the food objects are, and thereafter provide one or more recipes involving the present food objects.

In an embodiment, the smart display 30 may further comprise an integrated mechanical camera shutter that is adjustable by a user. The integrated mechanical camera shutter may be adjusted between an open position and a closed position by a user's interaction with a slide switch 51. The open position may be a state in which the shutter is not blocking or overlaying some of or the entire front-facing camera 35. The closed position may be a state in which the shutter is blocking or overlaying some of or the entire front-facing camera 35. A user may toggle between the two positions by grabbing the notch 51 and sliding it up or down.

An embodiment may be able to detect the position of the integrated mechanical camera shutter and thereafter perform a function based on the position. For example, in an embodiment, the smart display 30 may react to incoming communications differently depending on the position that the integrated mechanical camera shutter is in. For instance, in the open position, an embodiment may push all incoming communications (e.g., a text message, an email, a notification, a phone call, a video call, etc.) to the user. Conversely, in the closed position an embodiment may ignore, hide, or passively accept incoming communications without alerting the user. In another embodiment, responsive to receiving an incoming communication, such as a video call, when the integrated mechanical camera shutter is in the closed position, an embodiment may provide a notification (e.g., a visual notification, an audible notification, etc.) to a user that a video call is being received and/or who the communication is from. If a user wishes to accept the video call, a user may slide the notch 51 from the closed position to the open position to do so.

In an embodiment, a user may interact with digital assistant software employed on the smart display 30. Digital assistants may be capable of providing outputs (e.g., audible outputs, visual outputs, etc.) that are responsive to a variety of different types of user input (e.g., touch inputs, gesture inputs, voice inputs, etc.). In an embodiment, user input may be received at an input device (e.g., on-screen keyboard, audio capture device, image capture device, video capture device, etc.) operatively coupled to the smart display 30 and may be provided by any known method of providing input to an electronic device e.g., touch input, text input, gesture input, voice input, etc.). The input may thereafter be processed by the digital assistant and a corresponding output may be generated.

In an embodiment, the smart display 30 may be able to connect to and communicate with one or more other electronic devices (e.g., other smart devices such as smart appliances, smart TVs, etc.). For example, in an embodiment, the smart display 30 may be able to connect with an accessory device, or peripheral sensing device, to recognize family members (e.g., in a different room, at or near an entrance to the home, etc.) and initiate camera and video intercom channels upon request. A digital assistant employed by the smart display 30 may receive the user input "Hello smart display, are the kids upstairs? Would you let them know it's lunch time?" An embodiment may be able to recognize the audible command and interact with one or more accessory devices to determine the location of the kids and communicate the command to them. In another embodiment, a user may be able to send content (e.g., music, videos, maps, notes, shopping lists, etc.) to their connected devices (e.g., smart phones, tablets, etc.). The content may be sent via a wireless connection (e.g., using a BLUETOOTH connection, near field communication (NFC), wireless connection techniques, etc.), a wired connection (e.g., the device is coupled to another device or source, etc.), through a connected data storage system via cloud storage, remote storage, local storage, network storage, etc.), and the like.

The various embodiments described herein thus represent a technical improvement to conventional home automation systems. Rather than sacrificing ease of use and functionality to allow for integration of more features, the systems and methods described herein provide for an integrated hub-device that allows for optimization of device features in various modes of use. Such techniques enable a more intuitive and easy to use AIO home automation hub.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. An electronic device, comprising:
   a housing comprising:
      a fixed pyramidal-shaped base having a first triangular stand surface and a second triangular stand surface, wherein the first triangular stand surface comprises different dimensions than the second triangular stand surface;
   a display positioned on a front surface of the housing;
   an integrated speaker positioned on the front surface;
   at least one sensor;
      a connection port positioned on a back surface of the housing, opposite from the front surface, and at a distal corner along a longer edge of the fixed pyramidal-shaped base; and
   at least one processor operatively coupled to the display, integrated speaker, and at least one sensor.

2. The electronic device of claim 1, wherein the electronic device is supported by one of the first triangular stand surface or the second triangular stand while in any orientation.

3. An electronic device, comprising:
   a housing comprising:
      a fixed pyramidal-shaped base having a first triangular stand surface and a second triangular stand surface, wherein the first triangular stand surface comprises different dimensions than the second triangular stand surface;
   a display positioned on a front surface of the housing;
   an integrated speaker positioned on the front surface;
   at least one sensor;
      a connection port positioned on a back surface of the housing, opposite from the front surface, and at a distal corner along a longer edge of the fixed pyramidal-shaped base; and
      at least one processor operatively coupled to the display, integrated speaker, and the at least one sensor;
   a memory device operatively coupled to the at least one processor, the memory device storing digital assistant instructions for execution by the at least one processor to:
      receive, via the at least one sensor, user input and thereafter provide responsive output.

4. The electronic device of claim 3, wherein to provide responsive output comprises instructions executable by the at least one processor to access a network of computers.

5. The electronic device of claim 3, wherein the at least one sensor comprises at least one microphone.

6. The electronic device of claim 3, further comprising an electronic connection located proximate to a corner of the fixed pyramidal-shaped base.

7. The electronic device of claim 6, wherein the corner is distal from the display.

8. The electronic device of claim 3, further comprising an integrated camera shutter and wherein the instructions are further executable by the at least one processor to display, responsive to determining that the integrated camera shutter is in the open state, incoming communications.

9. The electronic device of claim 3, further comprising an integrated camera shutter and wherein the instructions are further executable by the at least one processor to not display, responsive to determining that the integrated camera shutter is in the closed state, incoming communications.

10. The electronic device of claim 3, wherein the housing further comprises at least two microphones, each of the microphones being positioned on a different side of the housing.

11. The electronic device of claim 10, wherein the instructions are further executable by the at least one processor to optimize, based upon a detected orientation, audio output by the electronic device using at least one of the at least two microphones.

12. The electronic device of claim 3, wherein the instructions executable by the at least one processor to receive user input comprise instructions executable by the at least one processor to detect and identify objects in a field of view in front of the electronic device.

13. The electronic device of claim 12, wherein the instructions executable by the at least one processor to provide responsive output comprise instruction executable by the processor to provide instructions to complete a task using the objects.

14. The electronic device of claim 3, wherein the instructions are further executable by the processor to connect and communicate with a plurality of other electronic devices.

* * * * *